United States Patent
McCullough et al.

(10) Patent No.: US 6,557,859 B2
(45) Date of Patent: May 6, 2003

(54) INJECTION MOLDABLE ELASTOMERIC GASKET

(75) Inventors: Kevin A. McCullough, Warwick, RI (US); James D. Miller, Marietta, GA (US); Mikhail Sagal, Watertown, MA (US)

(73) Assignee: Cool Options, Inc., Warwick, RI (US)

( * ) Notice: Subject to any disclaimer, the term of this patent is extended or adjusted under 35 U.S.C. 154(b) by 0 days.

(21) Appl. No.: 09/893,853

(22) Filed: Jun. 28, 2001

(65) Prior Publication Data

US 2002/0014748 A1 Feb. 7, 2002

Related U.S. Application Data

(60) Provisional application No. 60/223,227, filed on Aug. 4, 2000.

(51) Int. Cl.$^7$ ................................. F16J 15/02
(52) U.S. Cl. ................. 277/650; 277/628; 277/936; 277/938
(58) Field of Search ............................... 277/650, 651, 277/938

(56) References Cited

U.S. PATENT DOCUMENTS

| | | | |
|---|---|---|---|
| 4,545,926 A | * 10/1985 | Fouts et al. ............... 252/511 |
| 4,900,877 A | * 2/1990 | Dubrow et al. |
| 4,938,279 A | 7/1990 | Betker |
| 4,948,922 A | * 8/1990 | Varadan et al. |
| 4,999,741 A | 3/1991 | Tyler |
| 5,061,566 A | * 10/1991 | Morgan |
| 5,068,493 A | * 11/1991 | Benn et al. ............ 174/35 GC |
| 5,115,104 A | * 5/1992 | Bunyan |
| 5,187,225 A | * 2/1993 | Kitagawa |
| 5,315,480 A | 5/1994 | Samarov et al. |
| 5,430,609 A | 7/1995 | Kikinis |
| 5,440,172 A | 8/1995 | Sutrina |
| 5,513,070 A | 4/1996 | Xie et al. |
| 5,552,960 A | 9/1996 | Nelson et al. |
| 5,557,500 A | 9/1996 | Baucom et al. |
| 5,572,070 A | 11/1996 | Ross |
| 5,660,917 A | 8/1997 | Fujimori et al. |
| 5,738,936 A | 4/1998 | Hanrahan |
| 5,781,412 A | 7/1998 | de Sorgo |
| 5,790,376 A | 8/1998 | Moore |
| 5,910,524 A | * 6/1999 | Kalinoski |
| 6,204,303 B1 | 3/2001 | Osuna et al. |
| 6,348,654 B1 | * 2/2002 | Zhang et al. |
| 6,410,137 B1 | * 6/2002 | Bunyan |

* cited by examiner

*Primary Examiner*—Anthony Knight
*Assistant Examiner*—E Peavey
(74) *Attorney, Agent, or Firm*—Barlow, Josephs & Holmes, Ltd.

(57) ABSTRACT

A net-shape molded elastomeric gasket for dissipating heat and providing electro-magnetic interference (EMI) shielding for an electronic device is formed by loading a base elastomeric matrix material with thermally conductive filler and EMI reflective metallic filler and injecting the mixture into a mold cavity. The gasket of the present invention provides superior sealing between the case sections of an electronic device by shielding the device from EMI infiltration along the seam between the sections. In addition, the gasket of the present invention is in thermal communication with the case sections of the electronic device to provide thermal transfer and dissipation between the separate parts of the device.

4 Claims, 3 Drawing Sheets

INJECTION MOLDABLE ELASTOMERIC GASKET

CROSS-REFERENCE TO RELATED APPLICATIONS

This application claims priority from provisional patent application No. 60/223,227, filed Aug. 4, 2000.

BACKGROUND OF THE INVENTION

The present invention relates generally to electronic devices, integrated circuit components and interface materials used in assembling such components. More specifically, the present invention relates to gasket and interface materials used in assembling these devices that also function for transferring the heat generated within such devices and providing shielding against the effects of electro-magnetic interference (EMI).

In the small electronics and computer industries, it has been well known to employ various types of electronic component packages and integrated circuit chips, such as the central processing chips employed within cellular telephones and the central processing units (CPU's) used within palmtop computers like the Cassiopeia manufactured by Casio. These integrated circuit chips have a pin grid array (PGA) package and are typically installed into a socket, or are soldered directly onto a computer circuit board. These integrated circuit devices, particularly the CPU microprocessor chips, generate a great deal of heat during operation which must be removed to prevent adverse effects on operation of the system into which the device is installed. For example, the CPU within the Cassiopeia, a microprocessor containing millions of transistors, is highly susceptible to overheating which could destroy the microprocessor device itself or other components proximal to the microprocessor.

In addition to the Cassiopeia microprocessor discussed above, there are many other types of semiconductor device packages that are commonly used in other types of small electronics. Recently, various types of surface mount packages, such as BGA (ball grid array) and LGA (land grid array) type semiconductor packages have become increasingly popular as the semiconductor package of choice for small electronics.

The aforementioned electronic components are commonly employed in electronic devices, such as computers and cellular phones. These devices are being manufactured smaller and smaller and include faster and faster electronic components therein. As a result, heat generation and overheating continues to be a serious concern while the sizes of the devices get smaller. Therefore, problems arise as to how to effectively cool the small electronic components within the small and cramped environments within the device. Typical cooling solutions such as heat sinks and fans are not preferred because they are large and, as a result, consume large spaces within an already cramped electronic device case. In addition, since these small devices, such as cellular phones or laptop computers, must balance competing demands for higher power requirements, smaller battery sizes with the associated power limitations and overall device case size, active cooling solutions, such as powered fans and the like, are not desirable.

In addition, electromagnetic interference shielding is often required to ensure proper operation of the electronic device. Typically the shielding takes the form of a shielding layer within the device case, which encases the electronic component within the device to be protected. In these instances, a gasket must also be employed between the case components to prevent EMI form entering the device at the seam between the components. For example, in a cellular phone, there is typically a top housing and a bottom that mate to one another. A gasket is provided at the junction between the top housing and the bottom housing to prevent EMI from entering the device therebetween.

These gaskets are well known in the present art and are typically made of metal, such as aluminum, and are cast or machined into the desired configuration. Such manufacturing techniques are expensive and cumbersome, particular where the gasket includes complex geometries. In addition, metallic parts are relatively heavy, creating another drawback to their use. Alternatively, the gaskets may be manufactured of plastic or rubber, such as by injection molding, which is a relatively inexpensive process and provides a lightweight solution. However, such plastic or rubber material is inadequate for providing heat dissipation or heat transfer between the case components and is ineffective as EMI shielding. A plastic gasket may be plated to provide EMI shielding and thermal conductivity, but plating provides inferior thermal conductivity.

Therefore, in view of the foregoing, inexpensive light-weight injection molded gaskets that can be easily and cheaply manufactured yet still provide EMI shielding are highly desired. Gaskets that are also highly thermally conductive are further desired to assist in heat transfer between the outer case components of the device and the dissipation of heat from the electronic components within the device, such as microprocessor chips. There is also a demand for a gasket for use in an electronic device that is lightweight, has a low profile and is net-shape moldable from a thermally conductive material so that complex geometries for accurate mating of the case surfaces can be achieved.

SUMMARY OF THE INVENTION

The present invention is generally directed to a novel and unique gasket material for use in electronic device construction, providing a sealed construction that includes an improved heat dissipating system for cooling heat generating devices and provides shielding against the infiltration of electromagnetic interference (EMI) or radio frequency waves. The elastomeric gasket of the present invention enables complex shapes to be injection molded cost-effectively while providing passive cooling and improved EMI shielding for the electronic components contained within the device into which the gasket is incorporated.

In accordance with the present invention, an elastomeric gasket for providing a seal between the mating surfaces of the case sections of an electronic device is provided. The electronic device includes an electronic circuit board with a heat generating electronic component installed thereon, and at least two separate outer case components between which the gasket of the present invention is installed. The heat generating components on the circuit board are installed in such a manner as to be in thermal communication with one of the outer case components and may also be in thermal communication with the gasket of the present invention. In this configuration, the heat generated within the device can be transferred through one of the outer case components or through the gasket of the present invention to the other case components to provide increased surface area for improved heat dissipation. In addition, since the gasket of the present invention is elastomeric, it is inherently compressible, providing an effective seal between the gaps in the outer case components.

The elastomeric gasket is injected molded from a net shape moldable thermally conductive polymer composition. As the elastomeric gasket of the present invention is fabricated from plastic materials it is lighter than the metallic materials previously employed. In addition, the present invention also has the advantage of being net shape moldable, meaning, the part that is created in the injection molding process does not require any further processing steps after it is removed from the mold and before it is incorporated into the finished device. Both the lighter weight and the net-shape moldability are distinct advantages over the prior art where metallic parts had to be machined in several steps to achieve the desired part geometry.

Another feature of the present invention is the electromagnetic interference (EMI) shielding provided. Normally a separate EMI shield is installed in an electronic device. The shield acts as a shroud around the electronic component to shield it from electromagnetic interference. However, such a shield effectively encases the electronic component making access thereto for dissipating heat very difficult, if not impossible. Further, the EMI shield encasement prevents airflow to the electronic component for cooling. Since the gasket of the present invention is constructed from thermally conductive polymers it inherently absorbs EMI waves and prevents their leakage through the seam of the case components thereby preventing transmission to the electronic circuitry inside the device without the installation of an additional component. This feature is particularly important in applications such as cellular telephones where EMI waves can prevent the device from functioning properly. Thus a thermally conductive elastomeric gasket employed with a thermally conductive device case can effectively dissipate the heat generated within the device while assisting in shielding the electronic components from EMI waves without the addition of a separate EMI shield part that could potentially interfere with the heat transfer from the device.

It is therefore an object of the present invention to provide an elastomeric gasket for use in an electronic device that enhances the dissipation of heat from a heat generating electronic component mounted therein.

It is also an object of the present invention to provide an elastomeric gasket for use in an electronic device that directly provides heat dissipation for a heat generating electronic component mounted therein.

It is a further object of the present invention to provide an elastomeric gasket for use between the components of an electronic device case that passively provides heat transfer between the case components while sealing the gap therebetween.

Another object of the present invention is to provide an elastomeric gasket for use an electronic device that simultaneously seals the case components against the leakage of electromagnetic interference and provides heat transfer between the components of the device.

It is a further object of the present invention to provide an elastomeric gasket for an electronic device that is injection moldable from a thermal composite material into complex geometries to accommodate a variety of device case shapes.

Other objects, features and advantages of the invention shall become apparent as the description thereof proceeds when considered in connection with the accompanying illustrative drawings.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Figure 1:
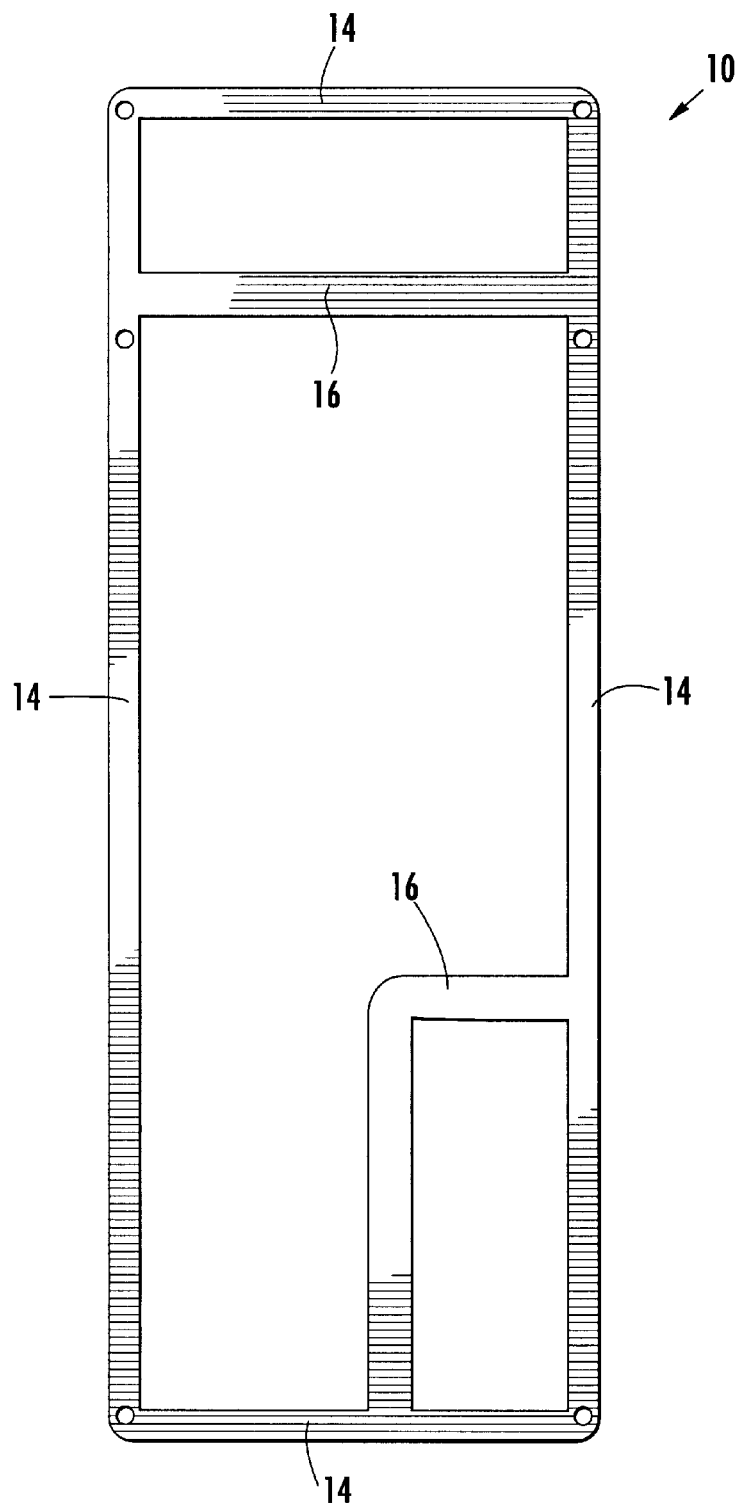
FIG. 1 is a plan view of the elastomeric gasket of the present invention.
Figure 2:
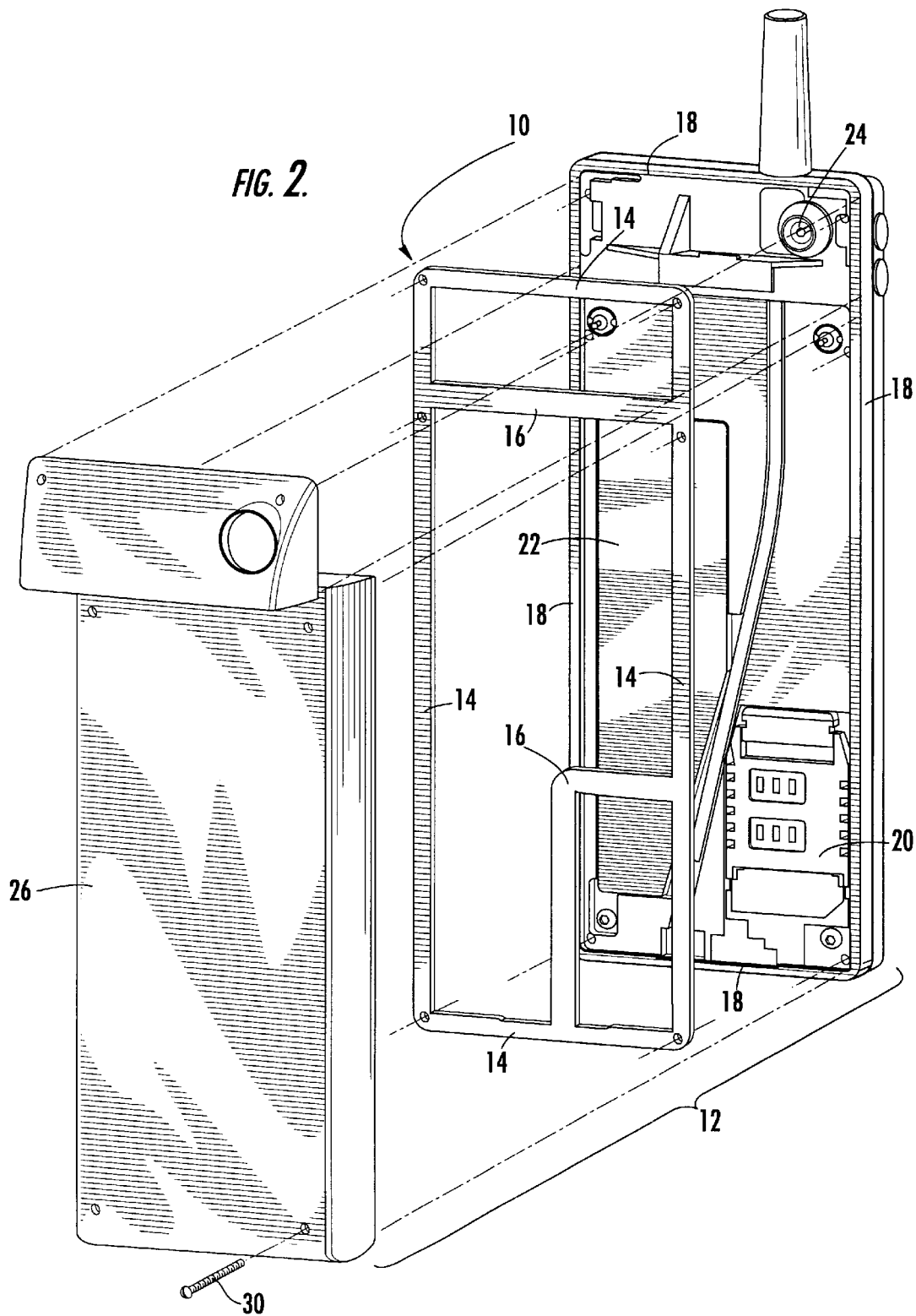
FIG. 2 is an exploded perspective view of the preferred embodiment of the electronic device showing the elastomeric gasket of FIG. 1.

Referring now to the drawings, the elastomeric gasket of the present invention is illustrated generally in FIG. 1. The present invention is a device, a composition from which the device is fabricated and a method by which that composition, formed by combining a polymer base matrix and a thermally conductive and EMI and RF wave absorptive or reflective filler, is molded into a finished component that has thermally conductive and EMI and RF wave shielding properties.

The device of the present invention is shown here, by way of example, as a gasket 10 for use in an electronic device assembly 12 such as a cellular telephone. The gasket 10 may have a complex geometry as shown, including an outer perimeter 14 of gasket material and intermediate gasket portions 16 connected to and located within the outer perimeter 14 of the gasket 10. This geometry allows the gasket 10 both to seal the outer edges 18 of the electronic device 12 and to seal individual compartments on the interior of the device 12. The ability to seal individual compartments within the electronic device 12, allows individual electronic components, such as the memory chip 20, to be isolated from the other electronic elements 22 within the device 12 that may create EMI and radio waves, which could potentially interfere with the operation of the memory chip 20. Similarly, the intermediate gasket portions 16 can create compartments within the electronic device to contain the EMI and radio waves generated therein, such as at the antenna location 24.

Figure 3:
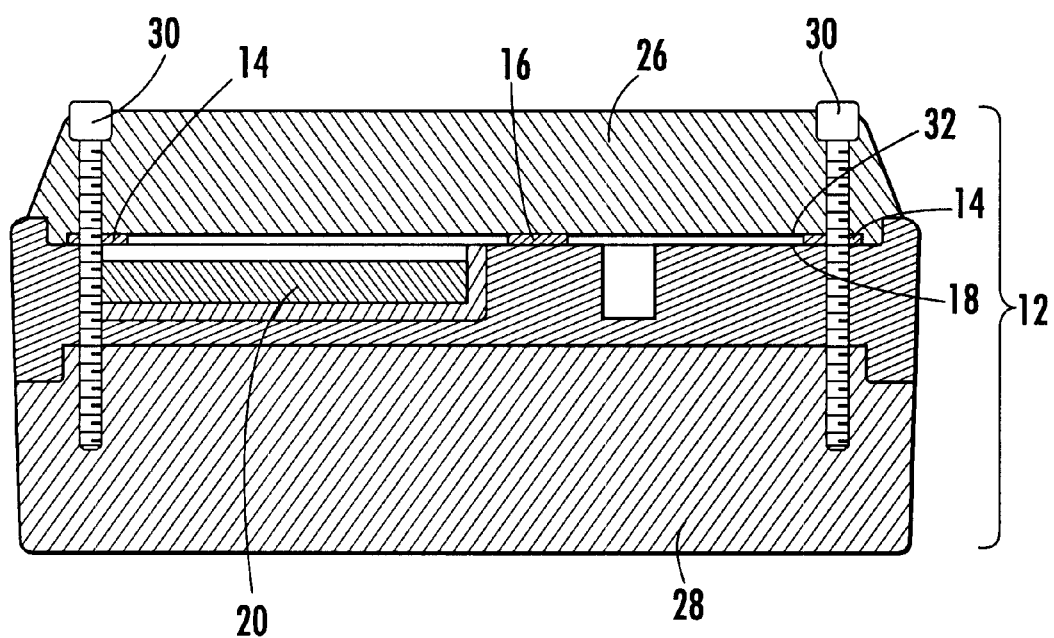
FIG. 3 is a cross-sectional view through the line 3—3 of FIG. 2.

The gasket 10 is installed between the front case component 26 and the rear case component 28 of the electronic device 12 and is firmly retained between the case components 26,28 using fasteners such as the screws 30 shown in FIG. 1. As seen in FIG. 3., both the perimeter 14 and interior 16 portions of the gasket 10 are firmly retained between the mating surfaces 18,32 of the device 12 case components 26,28. The fasteners 30 serve to firmly hold the case components 26, 28 together, maintaining a firm seal and preventing the infiltration of EMI and radio waves to the interior of the device 12.

The gasket 10 of the present invention is made from a material that employs a base matrix of polymer, for example, with different types of filler material loaded therein. The base matrix is, preferably, elastomeric polymer; however, it may be other materials. This composition is achieved through the steps of combining the base matrix material with a thermally conductive filler material and molding the composition. The base matrix is loaded with thermally conductive filler. The mix may include, for example, by volume, 40 percent base matrix and 60 percent filler material. Depending on the base matrix and filler, loading can be even higher. This process is known to result in producing polymer compositions with high thermal conductivities as compared to the base matrix alone.

One of the primary reasons for employing a thermally conductive polymer composition is that it is moldable into more complex geometries to achieve better gasket configurations. Because of the versatility of the material, applications that would clearly indicate its use are extremely widespread. Many of these applications, however, require both heat dissipating and electrical insulation to be provided concurrently. By way of example, an electronic device such as a cellular telephone 12 employs a small densely packed circuit package 20 to send and receive transmissions. The circuit 20 generates a great deal of heat and is continually bombarded with EMI and RF waves. To protect the surrounding device components 22 and telephone circuitry 20 from heat buildup and malfunctions resulting from EMI and RF absorption, the circuitry 20 must be sealed in an EMI and RF wave reflective compartment that can also effectively dissipate heat. Traditionally, these compartments would be sealed with gaskets that were constructed from a metallic material with reflective properties that prevent EMI and RF infiltration and also transfer heat. The traditional casings, however, have the traditional drawbacks associated with the fabrication of metal casings as discussed earlier.

In these applications, it is logical to attempt to employ thermally conductive polymers as a heat transfer solution. The drawback in the prior art is that although the polymers conduct heat, they also absorb and transfer EMI and RF waves over the same pathways used to transfer the heat. The present invention overcomes the absorption problem of the prior art allowing application of thermally conductive polymers in environments that also require EMI and RF wave shielding.

The present invention provides a thermally conductive composite material that is formed using a metallic thermally conductive filler material. The metallic properties of the thermally conductive filler material provides a barrier against the natural properties of the traditional carbon based fillers and polymer matrices to absorb EMI and RF waves while still conducting of heat through the mixture, allowing the heat transfer process to continue. The preferred embodiment of the present invention employs metallic flakes as a thermally conductive filler material. The metallic flakes are inherently thermally conductive yet EMI and RF wave reflective. The filler provides EMI and RF wave shielding to the naturally conductive filler material preventing transfer of EMI and RF waves throughout the final composition. The filler material is introduced to the base elastomeric polymer matrix. The two components are mixed and loaded into the desired molding machine and associated mold in a fashion known in the art which need not be discussed in detail here. Once removed from the mold, the final composition is in its final shape and ready for its end use.

As can be understood, the process does not eliminate the localized, introduction of EMI and RF waves into the composition or slight conductivity in localized areas within the material. The composition formed in the process of the present invention, however, prevents conduction and absorption of EMI and RF waves throughout the entire composition by interrupting the pathways within the composition over which the interference would flow.

The process of the present invention can be employed for many of the various configurations used in fabricating a thermally conductive composite. Although the preferred embodiment indicates the use of metallic flake filler in a elastomeric base matrix, many other fillers can be employed to achieve the desired thermally conductive composition. For example, traditional carbon or boron nitride fillers may be employed. The process would be varied so as to first coat the filler material with a metallic shell prior to incorporating it within the base polymer matrix. As the type of filler varies, the method of coating the particular material remains the same and EMI reflective metallic material is employed as the coating.

In view of the foregoing, a superior moldable thermally conductive composite gasket with EMI and RF wave reflective properties can be realized. The composition of the present invention, greatly improves over prior art attempts to provide such EMI and RF wave reflective, moldable, thermally conductive materials. In particular, the present invention provides thermal conductivity that is vastly improved over known compositions and provides insulation against the absorption EMI and RF waves that was until now unavailable in the prior art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A pre-formed thermally conductive, elastomeric gasket having a uniform cross-section, comprising:

an elastomeric polymer base matrix;

a first thermally conductive carbon filler loaded in said polymer base matrix; and a second electromagnetic and radio wave interference reflective filler loaded in said polymer base matrix.

2. A pre-formed thermally conductive, electrically resistive elastomeric gasket for use in an electronic device, comprising:

a net-shape molded elastomeric polymer base matrix loaded with a first thermally conductive carbon filler and a second metallic filler, wherein said gasket resides between and is in thermal communication with a first mating surface on a first case section of an electronic device and a second mating surface on a second case section of an electronic device, thereby facilitating thermal transfer there between.

3. The elastomeric gasket of claim 2, wherein said second metallic filler is capable of reflecting electromagnetic and radio wave interference thereby preventing the transfer of said interference to said electronic device.

4. A method of molding a pre-formed thermally conductive elastomeric gasket having a uniform cross-section, comprising the steps of:

providing a base elastomeric polymer matrix material;

providing a carbon flake filler material that is thermally conductive and electromagnetic interference and radio frequency reflective;

mixing said filler material with said base matrix into a mixture; and net-shape molding said mixture into a gasket, wherein said cross section of said gasket has a uniform distribution of said filler material throughout said base matrix material.

* * * * *